United States Patent
Graham et al.

(10) Patent No.: US 10,662,865 B2
(45) Date of Patent: May 26, 2020

(54) METHOD OF REMANUFACTURING A PRECHAMBER ASSEMBLY

(71) Applicant: Caterpillar Inc., Peoria, IL (US)

(72) Inventors: Curtis J. Graham, Peoria, IL (US); Timothy S. Graham, Golden, MS (US); Kegan J. Luick, Corinth, MS (US); Larry D. Bright, Walnut, MS (US)

(73) Assignee: Caterpillar Inc., Peoria, IL (US)

( * ) Notice: Subject to any disclaimer, the term of this patent is extended or adjusted under 35 U.S.C. 154(b) by 353 days.

(21) Appl. No.: 15/651,231

(22) Filed: Jul. 17, 2017

(65) Prior Publication Data

US 2018/0058305 A1    Mar. 1, 2018

Related U.S. Application Data

(60) Provisional application No. 62/381,803, filed on Aug. 31, 2016.

(51) Int. Cl.
| | |
|---|---|
| *F02B 19/12* | (2006.01) |
| *F02B 19/10* | (2006.01) |
| *F02B 19/16* | (2006.01) |
| *F02B 77/00* | (2006.01) |
| *F02B 77/04* | (2006.01) |
| *B23K 11/00* | (2006.01) |
| *B23P 6/02* | (2006.01) |
| *F02B 19/00* | (2006.01) |
| *H01T 21/02* | (2006.01) |
| *H01T 13/08* | (2006.01) |

(52) U.S. Cl.
CPC ........ *F02B 19/1009* (2013.01); *B23K 11/002* (2013.01); *B23P 6/02* (2013.01); *F02B 19/00* (2013.01); *F02B 19/12* (2013.01); *F02B 19/16* (2013.01); *F02B 77/005* (2013.01); *F02B 77/04* (2013.01); *H01T 13/08* (2013.01); *H01T 21/02* (2013.01); *Y02T 10/125* (2013.01)

(58) Field of Classification Search
USPC .......................................... 29/402.01–402.11
See application file for complete search history.

(56) References Cited

U.S. PATENT DOCUMENTS 3,449,816 A * 6/1969 Swick ...................... B23G 7/00
                                                          228/119
4,455,732 A * 6/1984 Shiets ................... B22D 19/10
                                                          29/402.06

(Continued)

*Primary Examiner* — George C Jin
*Assistant Examiner* — Teuta B Holbrook
(74) *Attorney, Agent, or Firm* — Brannon Sowers & Cracraft PC

(57) ABSTRACT

A method of remanufacturing a prechamber assembly includes determining a width W of an original circumferential weld bead that extends around and joins a proximal end of an outer peripheral wall of a prechamber housing and a distal end of an outer peripheral wall of a body assembly, cutting through the weld bead in order to separate the prechamber housing from the body assembly, and removing material from an outer peripheral portion of a distal end portion of the body assembly. The method includes removing the material in an axial direction parallel to the central axis of the prechamber assembly for a distance that is from 2.5-3 times the width W.

20 Claims, 6 Drawing Sheets

(56) References Cited

U.S. PATENT DOCUMENTS

| | | | | |
|---|---|---|---|---|
| 4,633,554 A * | 1/1987 | Clark | .................... | B23K 9/0026 |
| | | | | 29/888 |
| 4,751,778 A * | 6/1988 | Gray | .................... | E21B 17/042 |
| | | | | 29/401.1 |
| 5,172,475 A * | 12/1992 | Amos | .................... | B23P 6/002 |
| | | | | 228/119 |
| 5,554,908 A * | 9/1996 | Kuhnert | .................... | F02B 19/12 |
| | | | | 123/260 |
| 5,918,911 A * | 7/1999 | Sims | .................... | F16L 41/08 |
| | | | | 285/13 |
| 6,805,773 B1 * | 10/2004 | Brooker | .................... | C10J 3/00 |
| | | | | 202/217 |
| 7,547,859 B2 * | 6/2009 | Gandy | .................... | B23K 1/0012 |
| | | | | 219/61 |
| 7,552,855 B2 * | 6/2009 | Vargas | .................... | B23K 33/004 |
| | | | | 228/119 |
| 9,217,360 B2 | 12/2015 | Pierz | | |
| 9,631,579 B1 * | 4/2017 | Powers | .................... | F02M 21/0218 |
| 9,859,688 B1 * | 1/2018 | Gerstner | .................... | F02F 1/242 |
| 10,184,387 B2 * | 1/2019 | Graham | .................... | F02B 19/18 |
| 10,273,869 B2 * | 4/2019 | Graham | .................... | F02B 19/12 |
| 2006/0078080 A1 * | 4/2006 | Payne | .................... | G21C 13/036 |
| | | | | 376/204 |
| 2007/0169740 A1 * | 7/2007 | Riggs | .................... | F02B 19/1004 |
| | | | | 123/266 |
| 2007/0236122 A1 * | 10/2007 | Borror | .................... | H01T 13/54 |
| | | | | 313/118 |
| 2008/0173733 A1 * | 7/2008 | Raab | .................... | F02M 61/166 |
| | | | | 239/533.2 |
| 2011/0194663 A1 * | 8/2011 | Hori | .................... | F16L 5/022 |
| | | | | 376/204 |
| 2011/0308489 A1 * | 12/2011 | Herden | .................... | F02B 19/12 |
| | | | | 123/143 B |
| 2012/0037108 A1 * | 2/2012 | Herden | .................... | F02B 19/12 |
| | | | | 123/143 B |
| 2012/0073132 A1 * | 3/2012 | Sugitani | .................... | B23C 3/02 |
| | | | | 29/888 |
| 2014/0123456 A1 * | 5/2014 | Newton | .................... | G21C 13/036 |
| | | | | 29/402.08 |
| 2015/0145402 A1 * | 5/2015 | Hasegawa | .................... | H01T 13/32 |
| | | | | 313/140 |
| 2017/0358906 A1 * | 12/2017 | Kuhnert | .................... | H01T 13/32 |

* cited by examiner

METHOD OF REMANUFACTURING A PRECHAMBER ASSEMBLY

CROSS-RELATED TO RELATED APPLICATION

This application claims the benefit of U.S. Provisional Patent Application No. 62/381,803, filed Aug. 31, 2016, which is hereby incorporated by reference in its entirety.

TECHNICAL FIELD

The present disclosure relates generally to a prechamber assembly and, more particularly, to a method of remanufacturing a prechamber assembly.

BACKGROUND

Engines, including diesel engines, gasoline engines, gaseous fuel powered engines, and other engines known in the art ignite an air/fuel mixture to produce heat. Fuel directed into a combustion chamber of the engine can be ignited by way of a spark plug, a glow plug, or an AC/DC ignition source. The heat and expanding gases resulting from this combustion process are directed to displace a piston or move a turbine blade, both of which can be connected to a crankshaft of the engine. As the piston is displaced or the turbine blade is moved, the crankshaft is caused to rotate. This rotation is utilized to drive a device such as a transmission or a generator to propel a vehicle or to produce electrical power.

It has been established that a well-distributed flame inside the combustion chamber of an engine promotes improved combustion of the air-fuel mixture. Improved combustion can result in a reduction in air pollution and fuel consumption. One way to produce a well-distributed combustion flame is through the use of a combustion or ignition prechamber (referred to herein as "prechamber"). The prechamber can form a portion of the engine. For example, the prechamber may be formed within a high-temperature prechamber housing associated with a cylinder head, which is configured to close off one or more cylinders of an engine block. The high temperature prechamber housing may be connected to the cylinder head by a body assembly that includes one or more passages for directing fuel and air into the prechamber before the air-fuel mixture is introduced into the cylinder associated with the prechamber. The prechamber assembly may be positioned at least partially within an ignition bore in the cylinder head, and ignition of an air-fuel mixture may occur within the prechamber. Ignition of the air-fuel mixture within the prechamber may be initiated with a spark plug or by pressurizing the mixture within the prechamber until auto-ignition occurs. Flame propagation is then transferred to the combustion chamber by way of orifices in the prechamber housing, enabling complete ignition of a lean fuel-air mixture within the cylinder.

While the use of a prechamber provides certain performance improvements, the prechamber housing also requires periodic replacement or remanufacture, as even the high temperature materials forming the prechamber housing may eventually wear, corrode, or otherwise deteriorate to a level that may affect performance of the engine. Deterioration of the prechamber housing or openings from the prechamber housing into the cylinder can also affect flame propagation to the cylinder, and thereby affect the emission levels for the engine.

One attempt at improving heat removal from a prechamber device in order to improve the life of the prechamber device is disclosed in U.S. Pat. No. 9,217,360 (the '360 patent) that issued to Pierz on Dec. 22, 2015. In particular, the '360 patent discloses a prechamber device that includes a shell with an interior portion and an exterior portion and a thermally conductive core portion positioned within a cavity formed between the interior and exterior portions, and coolant flow passages providing liquid coolant to the exterior portion of the prechamber device.

Although the prechamber device of the '360 patent may have improved life, the complex structure and need to prevent the liquid coolant from flowing into contact with the combustion igniter may increase costs and reduce manufacturability. Moreover, the '360 patent does not address the problems associated with disassembly of the prechamber housing, or remanufacture and replacement of one or more components of a prechamber assembly.

The disclosed prechamber assembly and method of remanufacturing a prechamber assembly are directed to overcoming one or more of the problems set forth above and/or other problems of the prior art.

SUMMARY

In one aspect, the present disclosure is directed to a method of remanufacturing a prechamber assembly, the prechamber assembly including a prechamber housing welded to a body assembly. One of a distal end portion of the body assembly and a proximal end portion of the prechamber housing includes a reduced diameter portion, the other includes a counterbore configured to receive the reduced diameter portion, and an original circumferential weld bead extends around and joins a proximal end of an outer peripheral wall of the prechamber housing and a distal end of an outer peripheral wall of the body assembly along an original circumferential weld joint. The method may include determining a width W of the original circumferential weld bead as measured in an axial direction parallel to a central axis of the prechamber assembly, cutting through the weld bead in order to separate the prechamber housing from the body assembly, and removing material from an outer peripheral portion of the distal end portion of the body assembly, wherein the material is removed in an axial direction parallel to the central axis of the prechamber assembly for a distance that is from 2.5-3 times the width W.

In another aspect, the present disclosure is directed to a remanufactured prechamber assembly. The remanufactured prechamber assembly includes a remachined body assembly, and a new prechamber housing welded to the remachined body assembly along a new circumferential weld joint. One of a distal end portion of the remachined body assembly and a proximal end portion of the new prechamber housing includes a reduced diameter portion, and an axial length of the reduced diameter portion is configured to be fitted in a counterbore formed at the other of the distal end portion of the remachined body assembly and the proximal end portion of the new prechamber housing. A new circumferential weld bead extends around and joins a proximal end of an outer peripheral wall of the new prechamber housing and a distal end of an outer peripheral wall of the remachined body assembly along the new circumferential weld joint. A centerline of the new circumferential weld bead is spaced axially along the outer peripheral wall of the remachined body assembly toward a proximal end of the remachined body assembly from a location of a centerline of an original circumferential weld bead at an original circumferential weld joint around a distal end of the outer peripheral wall of the body assembly by a distance of 2.5-3 times a width W of the original circumferential weld bead as measured in an axial direction parallel to a central axis of the prechamber assembly.

In yet another aspect, the present disclosure is directed to a method of remanufacturing a prechamber assembly. The prechamber assembly includes a prechamber housing welded to a body assembly, wherein a distal end portion of the body assembly includes a reduced diameter portion, a proximal end of the prechamber housing includes a counterbore configured to receive the reduced diameter portion of the body assembly, and an original circumferential weld bead extends around and joins a proximal end of an outer peripheral wall of the prechamber housing and a distal end of an outer peripheral wall of the body assembly along an original circumferential weld joint. The method includes determining a width W of the original circumferential weld bead as measured in an axial direction parallel to a central axis of the prechamber assembly, cutting through the weld bead in order to separate the prechamber housing from the body assembly, and removing material from an outer peripheral portion of the distal end portion of the body assembly, wherein the material is removed in an axial direction parallel to the central axis of the prechamber assembly for a distance that is from 2.5-3 times the width W. The method further includes removing material from the outer peripheral portion of the distal end portion of the body assembly, wherein the material is removed in a radial direction relative to the central axis of the prechamber assembly to create a reduced diameter distal end portion of the body assembly that is from 2.4 W to 4 W smaller than the diameter of the outer peripheral surface at the distal end of the outer peripheral wall of the body assembly.

DETAILED DESCRIPTION

Figure 1:
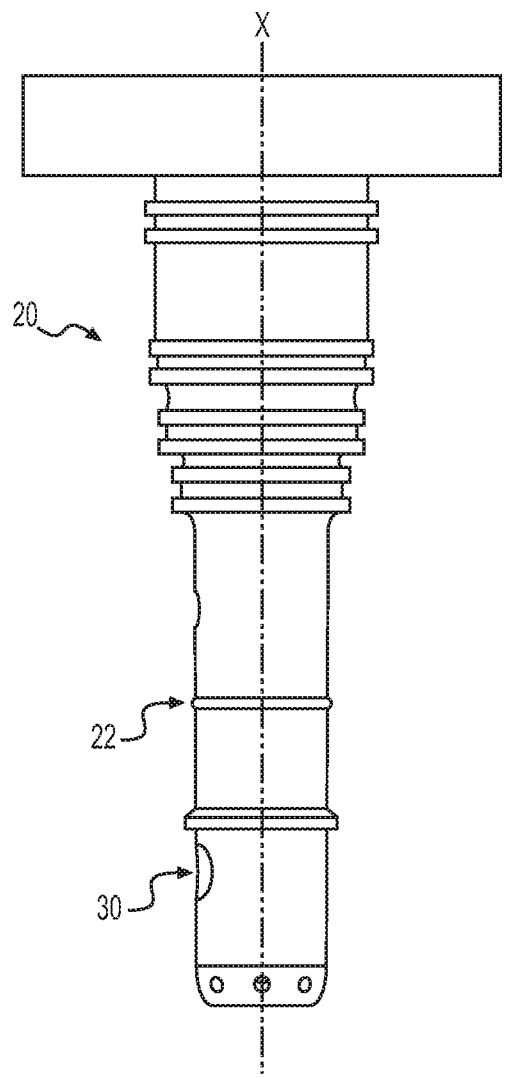
FIG. 1 is a diagrammatic illustration of an exemplary prechamber assembly.
Figure 2:
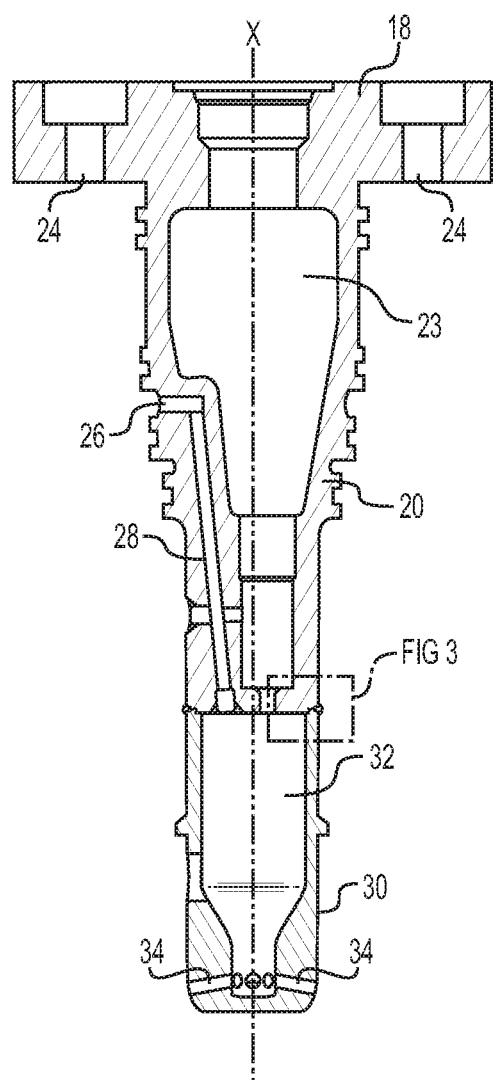
FIG. 2 is a cross-sectional illustration of the exemplary prechamber assembly of FIG. 1, illustrating internal flow passages and the prechamber.

FIGS. 1 and 2 illustrate an exemplary embodiment of a prechamber assembly, which may be connected to a cylinder head of a combustion engine in association with a cylinder defined within an engine block and housing a piston of the engine. The engine may be a four-stroke gaseous-fueled engine, for example a natural gas engine. One skilled in the art will recognize, however, that the engine including one or more prechamber assemblies such as illustrated in FIGS. 1 and 2 may be any other type of combustion engine such as, for example, a diesel engine, a gasoline-fueled engine, or a dual-fuel (e.g., a natural gas and diesel-fueled) engine. The engine may include an engine block and one or more cylinders formed in the engine block. A piston may be slidably disposed within each cylinder to reciprocate between a top-dead-center (TDC) position and a bottom-dead-center (BDC) position, and a cylinder head may be associated with each cylinder. Each cylinder, piston, and cylinder head may together define a combustion chamber. The engine may include any number of combustion chambers, and the combustion chambers may be disposed in an "in-line" configuration, in a "V" configuration, in an "opposing piston" configuration, or in any other suitable configuration.

The cylinder head may define one or more intake passageways and one or more exhaust passageways. Each intake passageway may direct compressed air or an air-fuel mixture from an intake manifold, through an intake opening, and into a combustion chamber. Exhaust passageways may similarly direct exhaust gases from each combustion chamber through an exhaust opening and into an exhaust manifold. In some embodiments, a turbocharger may be driven by the exhaust exiting the exhaust manifold to compress the air entering the intake manifold.

The amount of fuel allowed into an intake passageway may be associated with a ratio of air-to-fuel introduced into a combustion chamber. Specifically, if it is desired to introduce a lean mixture of air and fuel (mixture having a relatively low amount of fuel compared to the amount of air) into a combustion chamber, a fuel admittance device may remain in an injecting position for a shorter period of time (or otherwise be controlled to inject less fuel per given cycle) than if a rich mixture of fuel and air (mixture having a relatively large amount of fuel compared to the amount of air) is desired. Likewise, if a rich mixture of fuel and air is desired, the fuel admittance device may remain in the injecting position for a longer period of time (or otherwise be controlled to inject more fuel per given cycle) than if a lean mixture is desired. A lean mixture of air and fuel may be generally more difficult to ignite, but also burns at a lower temperature and produces less regulated emissions.

An igniter, including a prechamber assembly according to various exemplary embodiments of this disclosure, may help regulate the combustion of the fuel and air mixture within an associated combustion chamber. Each igniter may be configured to facilitate ignition of the air-fuel mixture within a corresponding combustion chamber. Specifically, the mixture of air and fuel within the main combustion chamber may be ignited by one or more flame jets propagating into the combustion chamber from a prechamber 32 of the prechamber assembly as the associated piston nears TDC during the compression stroke, as the piston leaves TDC during the power stroke, or at another appropriate time. The flame jets may be generated by the igniter through the use of the prechamber 32 defined within a prechamber housing 30 that is part of the prechamber assembly and the igniter. Some spark ignition engines will use the prechamber to increase the ignition energy imparted to the charge in the main combustion chamber. The flame jets originating in the prechamber and shooting out through passages connecting the prechamber to the main combustion chamber improve the ability of the engine to achieve a rapid and repeatable flame propagation in the engine combustion chambers at leaner air-fuel mixtures. According to various embodiments of the present disclosure, the igniter may be formed as a welded, two piece assembly including the prechamber housing 30 welded to an igniter body assembly (referred to herein as a body assembly) 20 at a weld joint 22. The body assembly 20 may include an igniter element (e.g., a spark plug or a glow plug), and the prechamber housing 30 and prechamber 32 may be mounted between the igniter element and the main combustion chamber within an engine cylinder.

In various alternative embodiments, prechamber housing 30 of the prechamber assembly may be joined to body assembly 20 to form the prechamber assembly by welding, or by using other joining techniques. Welding of prechamber housing 30 to body assembly 20 may be performed using a variety of different welding procedures, including laser beam welding, electron beam welding, resistance welding, shielded metal arc welding (SMAW), gas metal arc welding (GMAW), metal inert gas welding (MIG), gas tungsten arc welding (GTAW), oxyacetylene welding, flux core arc welding, plasma arc welding, submerged arc welding, electroslag welding, and friction welding.

The materials used for forming prechamber housing 30 may include inconel, or other materials able to withstand corrosion, wear, or other deterioration in the high temperature environment of prechamber 32 as the air-fuel mixture is ignited and at least partially combusted within prechamber 32. The body assembly 20 joined to the prechamber housing 30 may be formed from any of a variety of different metal alloys or other materials depending on the engine within which the igniter will be installed, fuels used, strength and durability requirements, and other parameters.

The prechamber assembly may be bolted to a cylinder head, e.g., through bores 24 in mounting boss 18 of the prechamber assembly such that each igniter is associated with a top end of a cylinder formed in the engine block, and each prechamber 32 defined within each prechamber housing 30 of the igniter is fluidly connected to a cylinder through one or more openings 34 formed at a distal end of the prechamber housing 30. The one or more openings 34 may extend substantially radially outward from one end of the prechamber housing 30 relative to a central axis X of the prechamber assembly, as shown in FIG. 2, or at other angles to the central axis X of the prechamber assembly. The prechamber 32 may have a cylindrical cross-section over at least part of its length, and may taper down to a smaller diameter at the end having the one or more openings 34. One or more internal passages 28 may be formed at least partially within the body assembly 20, fluidly connecting a source of fuel, air, and/or air-fuel mixture to the internal prechamber 32 defined within prechamber housing 30. The one or more internal passages 28 may optionally include a check valve 26 or other means for controlling the flow of fuel and/or air-fuel mixture into and out of prechamber 32. The body assembly 20 may also include an internal cavity 23 formed within the body assembly during its manufacturing. The internal cavity 23 may be provided to reduce weight of the prechamber assembly and to facilitate the casting of body assembly 20 by providing for more uniform thicknesses of the walls, ensuring uniform cooling and reduction of defects when the body assembly is cast from various metal alloys. In various exemplary embodiments, the body assembly may also house an igniter element at the distal end of the body assembly and in communication with the prechamber 32. In other alternative embodiments an igniter element may not be required if a means for compressing an air-fuel mixture within prechamber 32 to the point of self-ignition is provided.

Figure 3:
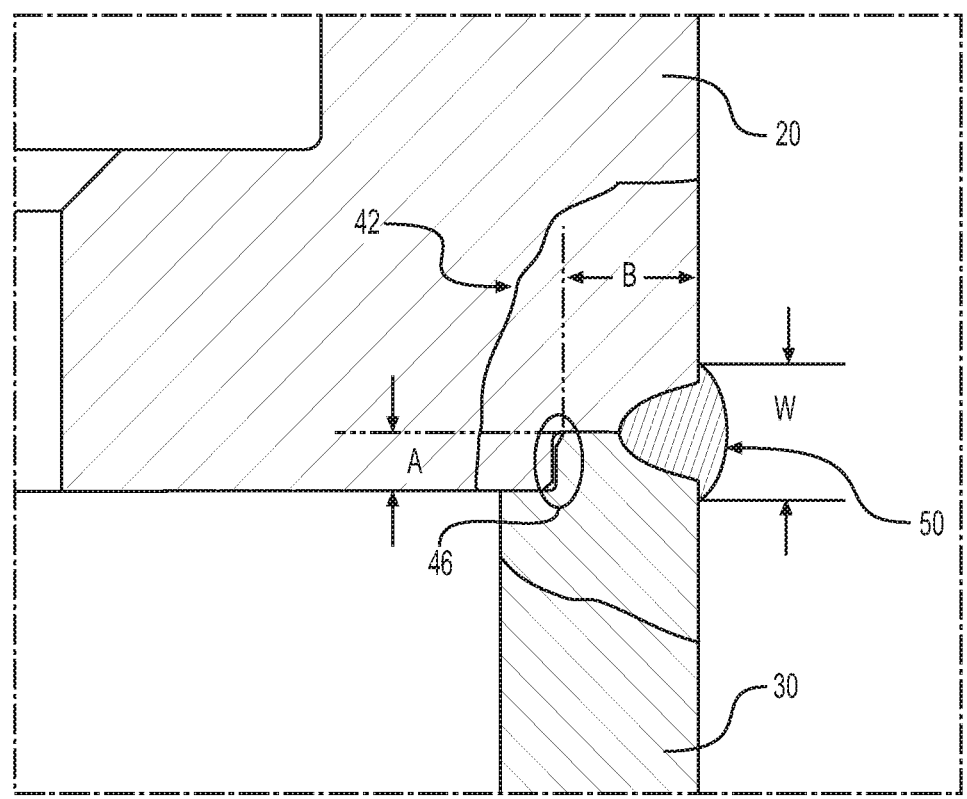
FIG. 3 is a cross-section taken through an exemplary partial interface between a distal end of an exemplary body assembly welded to a proximal end of an exemplary prechamber housing before remanufacturing.
Figure 7:
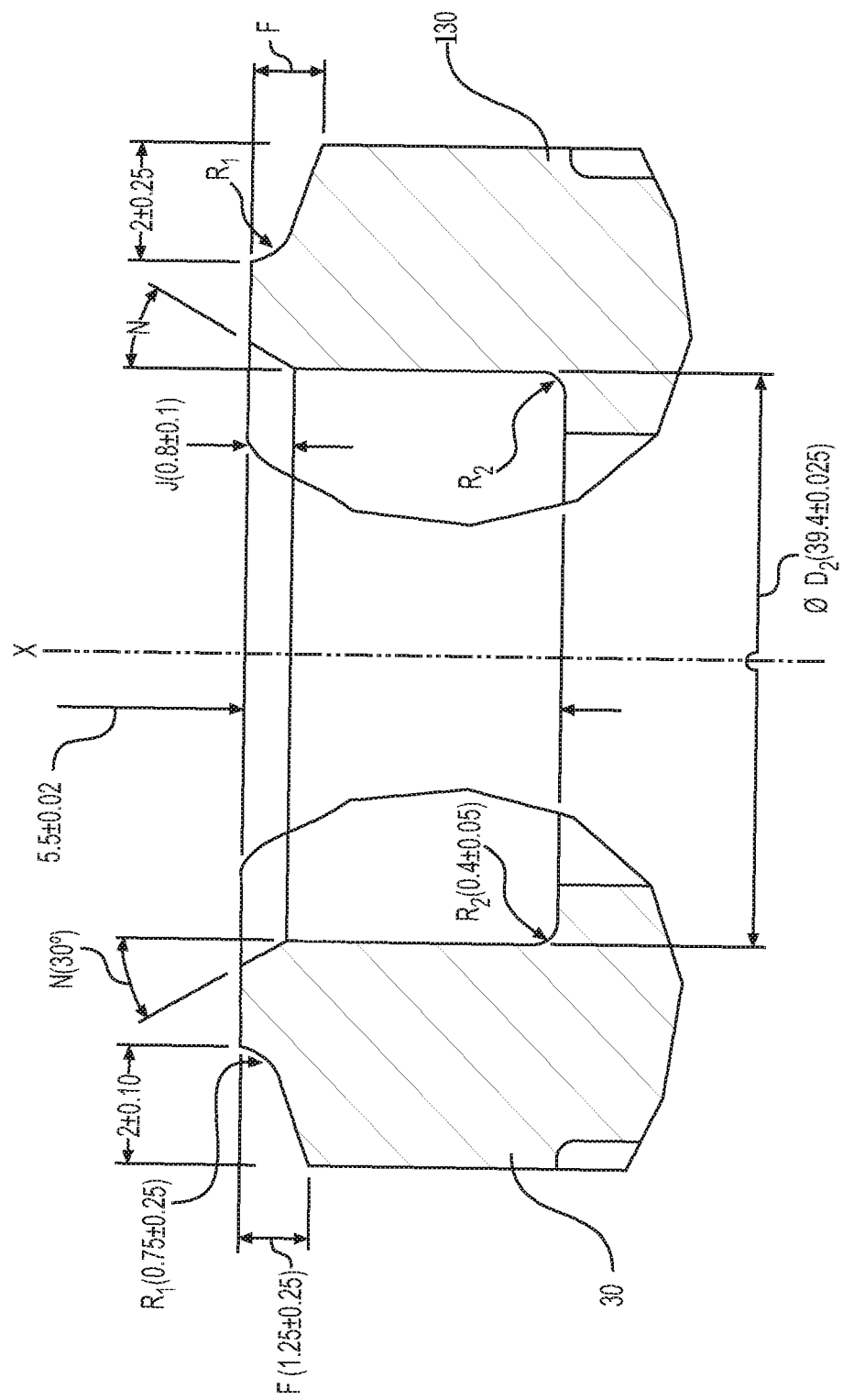
FIG. 7 is a cross-section taken through the proximal end of the exemplary prechamber housing of FIG. 5.

As shown in FIGS. 3 and 7, the prechamber housing 30 may include a counterbore at a proximal end of the prechamber housing 30 to be joined to a reduced diameter distal end portion of the body assembly 20. The body assembly 20 may include the reduced diameter distal end portion configured to be fitted into the counterbore of prechamber housing 30. In some implementations of this disclosure, an original prechamber assembly that requires remanufacturing may initially have had a slip fit interface 46 between the reduced diameter distal end portion of the body assembly and the counterbore of the prechamber housing. In some instances, corrosion may have begun at the interface between the parts of the prechamber assembly, which may be discovered upon cutting through the weld joint 22 to separate the old prechamber housing 30 from the body assembly 20.

Although the exemplary embodiments illustrated in the figures and discussed below include the body assembly 20 having a reduced diameter distal end portion configured to be fitted into a counterbore at the proximal end of the prechamber housing 30, 130, one of ordinary skill in the art will recognize that alternative embodiments may be configured with the prechamber housing 30, 130 having a reduced diameter proximal end portion that is fitted within a counterbore formed at the distal end portion of the body assembly 20. That is, the welded interface between the proximal end of the prechamber housing 30, 130 and the distal end of the body assembly 20 shown in FIGS. 2-5 may be reversed such that the proximal end of the prechamber housing 30, 130 has a reduced diameter proximal end portion, and the distal end of the body assembly 20 has a counterbore configured to receive the reduced diameter proximal end portion of the prechamber housing 30, 130. Similarly, FIG. 6 may represent an exemplary configuration of the proximal end of the prechamber housing 130 rather than the distal end of the body assembly 20, and FIG. 7 may represent an exemplary configuration of the distal end of the body assembly 20 rather than the proximal end of the prechamber housing 30, 130. The "distal" end of the body assembly 20 is the end of the body assembly opposite from the end joined to the cylinder head 18, and the "proximal" end of the prechamber housing 30, 130 is the end of the prechamber housing 30, 130 joined to the distal end of the body assembly 20 and opposite from the end of the prechamber housing 30, 130 having the one or more openings 34 that fluidly communicate with a cylinder.

FIG. 3 illustrates an axial cross-section of one exemplary prechamber assembly, taken through a portion of the interface where the proximal end of prechamber housing 30 is joined to the distal end of body assembly 20. An outer diameter of the reduced diameter distal end portion of body assembly 20 mates along the cylindrical slip fit interface 46 with an inner diameter of the counterbore at the proximal end of prechamber housing 30. A circumferential weld bead 50 may be formed around the circumferential interface between the proximal end of the outer peripheral wall of prechamber housing 30 and the distal end of the outer peripheral wall of body assembly 20 at the weld joint 22. As shown in FIG. 3, the original weld bead 50 may have a width W, as measured in an axial direction parallel to the central axis of the prechamber assembly and along the outer peripheral surface of the joined body assembly 20 and prechamber housing 30.

Figure 4:
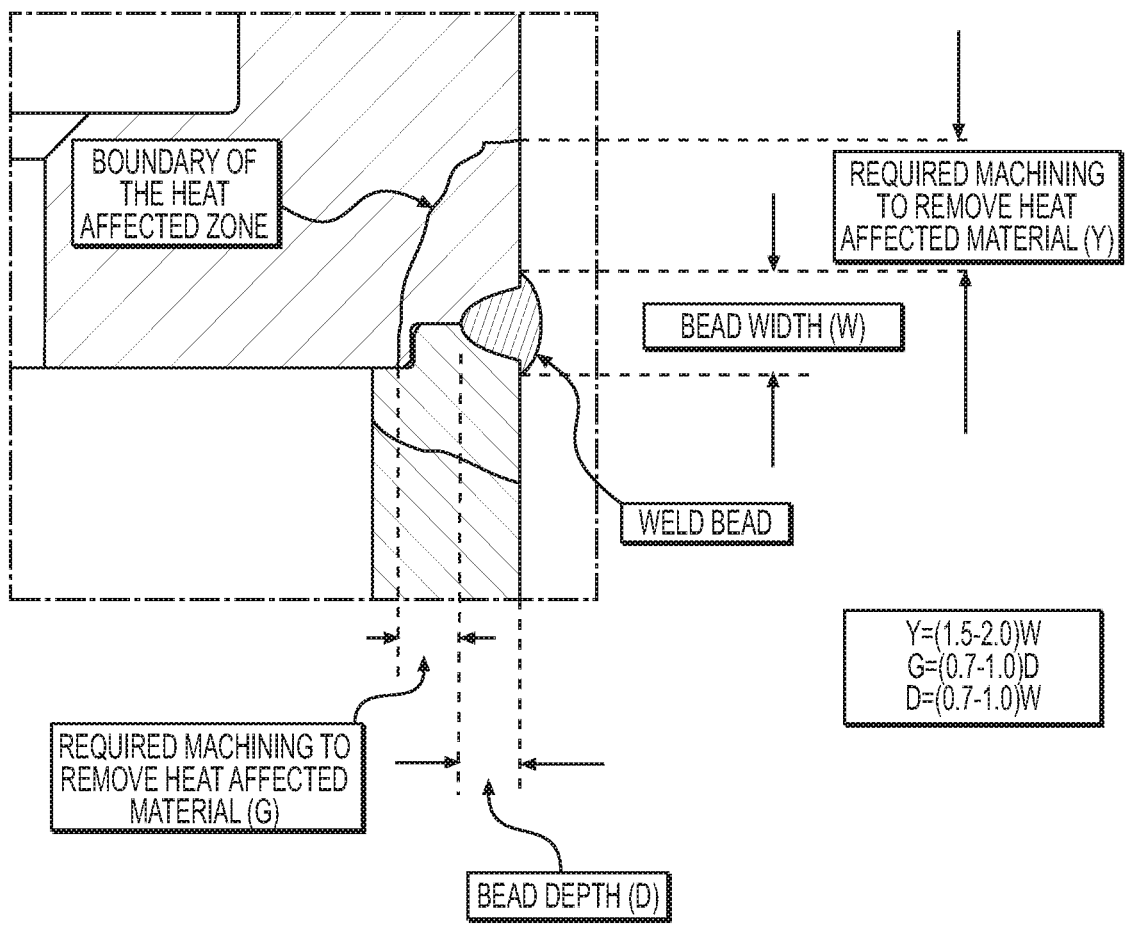
FIG. 4 illustrates dimensions and interrelationships between the dimensions for features illustrated in the cross-section of FIG. 3.

FIG. 4 is the axial cross-sectional view of FIG. 3, further illustrating the original weld bead 50 and original slip fit 46 between the outer diameter of the reduced diameter distal end portion of body assembly 20 and the inner diameter of the counterbore in the proximal end of prechamber housing 30. As shown in FIGS. 3 and 4, before remanufacturing of the prechamber assembly, an annular heat affected zone (HAZ) 42 may extend into the material surrounding the original weld bead 50 in both axial and radial directions from the weld bead and extending circumferentially around the prechamber assembly with the weld joint 22. The HAZ 42 is an area of the base material that was not melted during the welding operation, but that had its microstructure and properties altered by the welding. Factors that may have contributed to the extent and magnitude of the property changes in a HAZ may include the base material of one or both components being joined, the weld filler metal, and the amount and concentration of heat input by the welding process. The thermal diffusivity of the base materials may also play a significant role in the size of the HAZ. For base materials with high thermal diffusivity, the material cooling rate after welding is high and the HAZ is relatively small. Alternatively, base materials with low thermal diffusivity cool at a slower rate, thereby leading to a larger HAZ. The change in properties of the material in the HAZ 42 may result in less than ideal conditions for re-welding of a new prechamber housing after a deteriorated prechamber housing 30 is cut away from the distal end of the body assembly 20 during a remanufacturing operation. The HAZ may extend from the original weld bead 50 in both axial directions, and radially inward such that the HAZ encompasses portions of both the distal end of the body assembly 20 and the proximal end of prechamber housing 30.

According to various implementations of this disclosure, a remanufacturing operation performed on a prechamber assembly in order to replace a deteriorated prechamber housing may include first determining how much material should be removed from the distal end of the body assembly 20 after removing the original prechamber housing 30 in order to also ensure removal of all of the HAZ from the previous welding operation. The prechamber housing 30 may be replaced entirely rather than being remachined. Deterioration of the original prechamber housing 30 and changes in properties of the prechamber housing as a result of continued exposure to high combustion temperatures and the ensuing corrosion of internal surfaces of the prechamber may prevent reuse, and removal of HAZ material from the distal end of the body assembly 20 may require a replacement prechamber housing with a greater amount of material at the mating interface with a remachined distal end portion of the body assembly.

As illustrated in FIG. 4, the original width W of the weld bead 50 may be measured before cutting through the weld in order to detach the original prechamber housing 30 from the distal end of the body assembly 20. The width W of the original weld bead may be measured in an axial direction parallel to the central axis of the prechamber assembly and along the outer peripheral surface of the prechamber assembly. The original location of a centerline of the weld bead relative to a proximal end of the body assembly may also be measured. The axial distance between the proximal end of the body assembly and the centerline of the original weld bead, or between any other portion of the body assembly that will not be affected by remachining of the distal end portion of the body assembly and the centerline of the original weld bead may establish a reference distance for determining how much material to remove from the distal end of the body assembly to remove all of the HAZ. It has been estimated in accordance with exemplary implementations of this disclosure that the original HAZ 42 may extend in an axial direction beyond an outer edge of the original weld bead 50 from the intersection between the edge of the weld bead and the body assembly 20 toward the proximal end of the body assembly by a distance Y, where Y is from 1.5 to 2 times the width W of the original weld bead 50 ($Y=[1.5-2.0]$ W). Moreover, it has been estimated in accordance with exemplary implementations of this disclosure that the original HAZ 42 may extend radially inward below the depth D of the original weld bead 50 by a distance G, where G is from 0.7 to 1.0 times the depth D of the original weld bead 50 ($G=[0.7-1.0]$ D). It has been further determined according to exemplary implementations of this disclosure that the depth D of the original weld bead 50 may be from 0.7 to 1.0 times the width W ($D=[0.7-1.0]$ W). The original HAZ 42 may therefore extend in a radially inward direction from the outer peripheral surface of the distal end of the body assembly 20 by a distance that may range from approximately 1.2-2.0 times the width W.

The relationships discussed above between the original weld bead width W and the extent of the HAZ may be determined through extensive metallurgical analyses of test sections taken through welded prechamber assemblies. In various alternative implementations of this disclosure, other relationships unrelated to the width W of the original weld bead 50 may be determined through extensive empirical, historical, and/or physics-based analyses. For example, the extent of the HAZ surrounding a welded interface between the body assembly 20 and the prechamber housing 30 may be determined as a percentage of one or more other dimensions of the original components, such as the diameter at the welded interface where the outer peripheral surface of the distal end portion of the body assembly meets the outer peripheral surface of the proximal end portion of the prechamber housing. Other parameters that may be included in a determination of the extent of the HAZ, as discussed above, may include the base materials of one or both of the body assembly and the prechamber housing, the weld filler metal, the amount and concentration of heat input by the original welding process, and the thermal diffusivity of the base materials.

Figure 5:
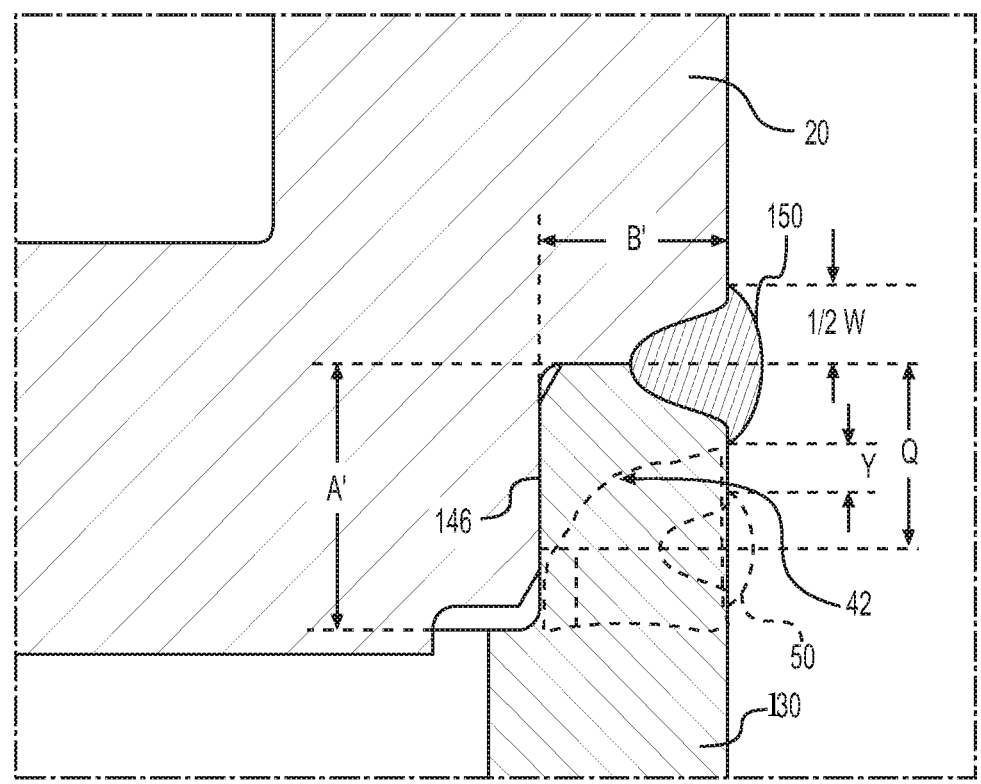
FIG. 5 is a cross-section taken through the exemplary partial interface between the distal end of the exemplary body assembly welded to the proximal end of the exemplary prechamber housing of FIG. 3 after remanufacturing.

The amount of remachining of the distal end portion of the original body assembly 20 after detachment from the deteriorated prechamber housing 30 may be determined based on the above-discussed relationships between the original HAZ and the measurable width W of the original weld bead 50, as determined according to various implementations of this disclosure. After detachment of the original prechamber housing 30, material from the outer periphery of the distal end portion of the body assembly 20 may be removed by machining or other metal removal processes in order to extend the axial length of a reduced diameter distal end portion of the body assembly 20 by a distance $Q=W+Y$, where Y is from 1.5 to 2 times the width W of the original weld bead 50 ($Y=[1.5-2.0]$ W). In other words, the axial length of the reduced diameter distal end portion of body assembly 20 may be extended by a distance that may range from 2.5 W to 3 W. As shown in FIGS. 4 and 5, Y represents the axial extent of the HAZ beyond the intersection between the edge of the original weld bead 50 and the outer peripheral surface of the body assembly 20. Therefore, the axial distance $Q=W+Y$ may represent the distance the centerline of the new weld bead 150 must be moved from the centerline of the original weld bead 50 in a direction parallel to the central axis X of the prechamber assembly to ensure that the entire new weld bead 150 does not encroach upon any HAZ from the original weld joint. The centerline of the new weld bead 150 is shown spaced from the centerline of the original weld bead 50 by the distance Q in the cross-sectional view of FIG. 5. The above-determined reference distance between a proximal end of the body assembly and the centerline of the original weld bead 50 may be used in conjunction with the distance Q in determining the location of the centerline of the new weld bead 150 on a remanufactured prechamber assembly. The axial length of the reduced diameter distal end portion of the remachined body assembly may therefore be represented by A', as shown in FIG. 5, and A' may be determined to equal the original axial length A of the original reduced diameter distal end portion of the body assembly (shown in FIG. 3) plus Q. As discussed above, Q=2.5 W-3.0 W. Therefore, in the exemplary implementation wherein the above-discussed relationship between original weld bead width W and the extent of the HAZ is established, the axial length of the reduced diameter distal end portion of the remachined body assembly 20 for a remanufactured prechamber assembly may be increased by 2.5 W-3 W from the original axial length A of the reduced diameter distal end portion of the original body assembly 20. The resulting shift in the location of the centerline of the weld bead at the distal end of the body assembly may be observed as a reduction in the above-discussed reference distance between a proximal end of the body assembly and the centerline of the weld bead by the amount Q=2.5 W-3.0 W.

The reduced diameter distal end portion of the body assembly 20 may also be machined radially inwardly to remove the HAZ 42. As shown in FIGS. 4 and 5, the remachined body assembly 20 may be machined radially inwardly from the outer peripheral surface at the distal end portion of the body assembly by an amount G+D, wherein G represents the radial extent of the HAZ below the original weld bead 50. As discussed above, G may be from 0.7 to 1.0 times the depth D of the original weld bead 50 (G=[0.7-1.0] D). And since D=[0.7-1.0] W, the reduced diameter distal end portion of the body assembly 20 may be machined radially inwardly by an amount that may range from approximately 1.2 W to 2.0 W. In other words, the reduced diameter distal end portion of the body assembly 20 after remachining to remove HAZ may have a diameter that ranges from 2.4 W to 4 W smaller than the diameter of the original outer peripheral surface at the distal end of the body assembly. In view of the above relationships between the original weld bead width W and the amounts of material removed from the distal end portion of the body assembly to eliminate HAZ surrounding the original weld bead, the various implementations of this disclosure facilitate remanufacturing of the prechamber assembly by ensuring that the new weld joint does not encroach upon old HAZ material from the original weld joint.

Therefore, according to implementations of this disclosure, the original reduced diameter distal end portion of the body assembly may have an outer radius that is an amount B less than the radius at the original outer peripheral surface where the outer circumferential interface is formed between the proximal end of the outer peripheral surface of prechamber housing 30 and the distal end of the outer peripheral surface of body assembly 20 (as shown in FIG. 3). After remanufacturing to remove the old prechamber housing 30 and all of the HAZ 42, the new reduced diameter distal end portion of the body assembly 20 may have an outer radius that is an amount B' less than the radius at the outer circumferential interface, where B'=1.2 W-2.0 W. As further shown in FIG. 5, the axial length of the reduced diameter distal end portion of the body assembly after remachining may be increased from the axial length before remachining by an amount Q=W+Y (where Y=[1.5-2.0] W). This increase in the axial length of the new reduced diameter distal end portion of the body assembly is indicative of the axial distance between the centerline of the original weld bead 50 and the centerline of the new weld bead 150 around the outer circumferential interface between the proximal end of the outer peripheral surface of a new prechamber housing 130 and the distal end of the outer peripheral surface of the remachined body assembly 20.

As shown in FIG. 5, the new axial length A' of the reduced diameter distal end portion of the body assembly 20 is a result of removing enough material from the outer periphery of the distal end portion of the original body assembly to ensure that welding of the new weld bead 150 will not run into the HAZ 42 that was created around the original weld bead 50. Additionally, the new radial depth B' of the reduced diameter distal end portion of the body assembly 20 also extends far enough in a radially inward direction from the outer circumferential interface at the weld joint to ensure removal of all of the original HAZ from the body assembly 20. As discussed above, the new axial length A' of the reduced diameter distal end portion of the body assembly 20 is an increase of the original axial length A by an amount of 2.5 W-3.0 W, and the new diameter of the reduced diameter distal end portion of the body assembly 20 is from 2.4 W to 4 W smaller than the diameter of the original outer peripheral surface at the distal end of the body assembly.

Figure 6:
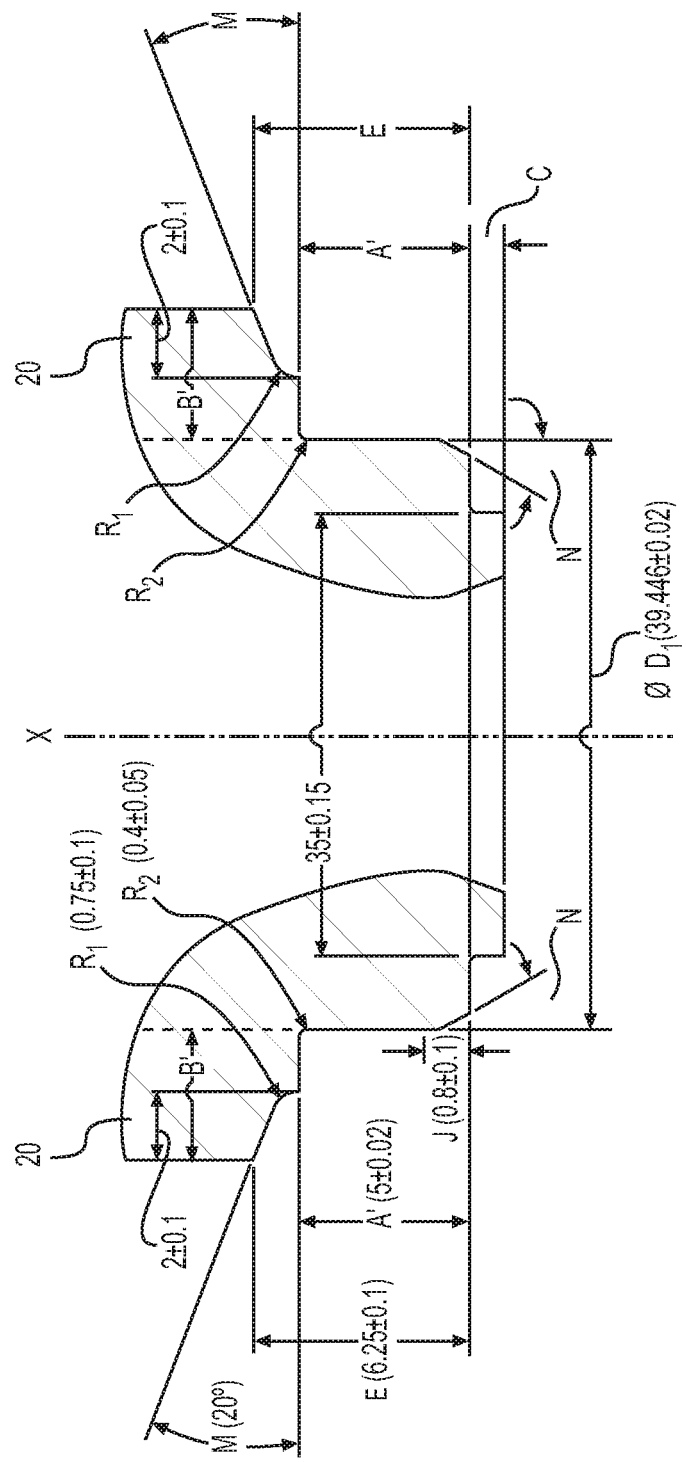
FIG. 6 is a cross-section taken through the distal end of the exemplary body assembly of FIG. 5.

As shown in FIGS. 6 and 7, the new reduced diameter distal end portion of body assembly 20 after remachining may have an outer diameter D1 that is slightly larger than the inner diameter D2 of the counterbore at the proximal end of a new prechamber housing 130. The dimensions and tolerances of the reduced diameter distal end portion of remachined body assembly 20 and of the counterbore at the proximal end of the new prechamber housing 130 may be selected and machined during a remanufacturing operation to ensure a cylindrical press fit interface 146 between the two parts of the prechamber assembly. The cylindrical press fit interface 146 between the joined parts of the prechamber assembly may assist in preventing the formation of a path for corrosion between the new prechamber housing 130 and the remachined body assembly 20. The new prechamber housing 130 may be welded to the remachined body assembly 20 around the outer periphery of the circumferential interface between a proximal end of the outer peripheral wall of new prechamber housing 130 and a distal end of the outer peripheral wall of remachined body assembly 20 after the reduced diameter distal end portion of body assembly 20 is press fit into the counterbore at the proximal end of prechamber housing 130.

INDUSTRIAL APPLICABILITY

The disclosed method for remanufacturing prechamber assemblies, and the disclosed exemplary interface geometries for a remachined body assembly 20 and a replacement prechamber housing 130 may be applicable to prechamber assemblies used in many different internal combustion engines under a large variety of operating conditions over the life of the internal combustion engine. The disclosed dimensions and relationships between dimensions at the interface between the parts of the prechamber assembly may facilitate the remanufacturing process by ensuring that old heat affected zone (HAZ) material formed around the weld joints of an existing prechamber assembly is completely removed before a new prechamber housing is welded to the remachined body assembly to form a remanufactured prechamber assembly.

When remanufacturing a prechamber assembly such as shown in FIGS. 3 and 4, measurements of the width W of the original weld bead 50 may be taken in order to estimate how much material will be removed from the distal end portion of the body assembly 20 to ensure removal of all of the original HAZ. In order to determine the dimensions discussed above, numerous sections through a large number of welded prechamber assemblies were taken and metallurgical analyses performed on each of the sections. The metallurgical analyses of the sections establish that in some exemplary implementations of this disclosure the extent of the HAZ may be related to the width W of the original weld bead formed at the outer circumferential interface between the proximal end of the outer peripheral wall of prechamber housing 30 and the distal end of the outer peripheral wall of body assembly 20. As discussed above, empirical, historical, and/or physics-based analyses may also contribute to the determination of other relationships between the extent of the HAZ and one or more other measurable dimensions and/or characteristics of the original prechamber assembly.

In one exemplary implementation of this disclosure, after determining the width W of the original weld bead 50, the body assembly 20 may be cut apart from the prechamber housing 30 by cutting radially inward and circumferentially around the prechamber assembly at the weld joint 22 in a plane orthogonal to the central axis of the prechamber assembly and coincident with a centerline of the weld bead 50. After separation of the original prechamber housing 30 from the distal end portion of the body assembly 20, the distal end portion may be machined to the dimensions shown in FIGS. 5 and 6. The dimensions (in millimeters) shown for the remachined body assembly 20 and new prechamber housing 130 illustrated in FIGS. 6 and 7, respectively, are provided as just one illustrative example of the potential configurations for the interface geometry of the distal end portion of a remachined body assembly and the proximal end portion of a new prechamber housing. In the exemplary configuration of FIG. 6, a circumferential weld cut-out chamfer may be machined around the outer peripheral surface of the distal end of body assembly 20 to form an angle M with a plane orthogonal (perpendicular) to a central longitudinal axis X of the body assembly 20. In the exemplary embodiment of FIG. 6, the angle M may be 20 degrees, the radial extent of the weld cut-out chamfer may be 2.0 mm±0.1 mm, and the axial extent of the weld cut-out chamber may be 1.25 mm±0.12 mm. The weld cut-out chamfer around the outer peripheral surface of the distal end of body assembly 20 may be configured to mate with a mirror-image circumferential weld cut-out chamfer around the outer peripheral surface of the proximal end of the pre-chamber housing, as shown in FIG. 7. When the reduced diameter distal end portion of the body assembly 20 is fully mated with the counterbore in the proximal end portion of the prechamber housing 130, the respective circumferential weld cut-out chamfers of each part may be joined to form a circumferential U-shaped recess within which the new circumferential weld bead 150 is formed. One of ordinary skill in the art will recognize that the dimensions of the weld cut-out chamfers and other features illustrated in FIGS. 6 and 7 may vary depending on factors that may include manufacturing tolerances, the overall size of the prechamber assembly, the method of welding that may be employed in joining the prechamber housing to the body assembly, the materials used, etc.

The outer diameter $D_1$ (e.g., 39.446 mm±0.02 mm) of the reduced diameter distal end portion of the body assembly 20 in the exemplary embodiment of FIG. 6 may extend longitudinally in a direction parallel to the central axis X of the prechamber assembly for the distance A' (e.g., 5.0 mm±0.02 mm). As discussed above, the axial length A' of the reduced diameter distal end portion of the body assembly 20 may be increased from the original axial length A (shown in FIG. 3) by 2.5 W-3 W. The reduced diameter distal end portion of the body assembly 20 may terminate at another circumferential chamfer of axial length J (e.g., 0.8 mm±0.1 mm) and angle N (e.g., 30 degrees) to the outer circumferential surface of the reduced diameter distal end portion. In some embodiments, this circumferential chamfer may transition to a further reduced diameter (e.g., 35 mm±0.15 mm) distal end portion of axial length C. The radially inner circumference of each of the weld cut-out chamfers may be provided with a circumferential fillet having a radius $R_1$ (e.g., 0.75 mm±0.1 mm), and the proximal end of the extended reduced diameter distal end portion of the remachined body assembly 20 may be provided with a fillet having a radius $R_2$ (e.g., 0.4 mm±0.05 mm). These radii may be configured at least in part to reduce the potential for any stress concentrations at the transition locations.

As shown in FIG. 7, a new prechamber housing 130 may be provided with a counterbore at a proximal end of the prechamber housing having an inner diameter of D2 (e.g., 39.4 mm±0.025 mm) that is slightly less than the outer diameter D1 (e.g., 39.446 mm±0.02 mm) in order to provide for a press fit interface 146 (FIG. 5) between the reduced diameter distal end portion of the remachined body assembly 20 and the counterbore at the proximal end of the new prechamber housing 30. The cylindrical press fit interface 146 between the two parts of the prechamber assembly may provide a barrier to corrosion forming at the interface, and may facilitate automation of the welding process.

It will be apparent to those skilled in the art that various modifications and variations can be made to the disclosed methods and configurations. For example, as discussed above, in some alternative implementations of this disclosure, relationships between one or more dimensions of the original prechamber assembly and the HAZ may be determined as a result of extensive metallurgical analyses of sections through existing prechamber assemblies. In some alternative implementations of remanufacturing processes according to this disclosure, the original body assembly may be provided with a counterbore at the distal end that mates with a reduced diameter proximal end portion of the prechamber housing. In these alternative implementations there may be sufficient material at the distal end of the original body assembly to machine away all of the HAZ around the original weld bead and form a new counterbore of the same dimensions as the original counterbore farther up the side of the body assembly for mating with a reduced diameter proximal end portion of a new prechamber housing. Other embodiments will be apparent to those skilled in the art from consideration of the specification and practice of the disclosed remanufacturing processes. It is intended that the specification and examples be considered as exemplary only, with a true scope being indicated by the following claims and their equivalents.

What is claimed is:

1. A method of remanufacturing a prechamber assembly, the prechamber assembly including a prechamber housing welded to a body assembly, wherein one of a distal end portion of the body assembly and a proximal end portion of the prechamber housing includes a reduced diameter portion, the other includes a counterbore configured to receive the reduced diameter portion, and an original circumferential weld bead extends around and joins a proximal end of an outer peripheral wall of the prechamber housing and a distal end of an outer peripheral wall of the body assembly along an original circumferential weld joint, the method comprising:

determining a width W of the original circumferential weld bead as measured in an axial direction parallel to a central axis of the prechamber assembly;
cutting through the weld bead in order to separate the prechamber housing from the body assembly;
removing material from an outer peripheral portion of the distal end portion of the body assembly; wherein the material is removed in an axial direction parallel to the central axis of the prechamber assembly for a distance that is from 2.5-3 times the width W; and
removing a heat affected zone of the original circumferential weld bead extending circumferentially around the central axis, based on the removal of material from an outer peripheral portion of the distal end portion of the body assemble.

2. The method of claim 1, further including:
removing material from the outer peripheral portion of the distal end portion of the body assembly, wherein the material is removed in a radial direction relative to the central axis of the prechamber assembly for a distance that is from 1.2-2.0 times the width W.

3. The method of claim 2, further including providing a new prechamber housing including one of a counterbore or a reduced diameter portion at a proximal end of the new prechamber housing, wherein the one of the counterbore or the reduced diameter portion of the new prechamber housing is configured to form a press fit with one of a reduced diameter portion or a counterbore, respectively, at a distal end portion of the body assembly.

4. The method of claim 3, wherein the one of the counterbore or the reduced diameter portion at the proximal end of the new prechamber housing is configured to mate along an axial length of the one of the reduced diameter portion or the counterbore, respectively, at the distal end portion of the body assembly to form a cylindrical press fit interface.

5. The method of claim 1, wherein:
the distal end portion of the body assembly includes the reduced diameter portion, and the proximal end portion of the prechamber housing includes the counterbore; and
material is removed from the outer peripheral portion of the distal end portion of the body assembly to extend the axial length of the reduced diameter distal end portion of the body assembly by a distance that is 2.5-3 times the width W.

6. The method of claim 5, wherein material is removed from the outer peripheral portion of the distal end portion of the body assembly in a radially, inward direction relative to the central axis of the prechamber assembly for a distance ranging from 1.2-2.0 times the width W to form the reduced diameter distal end portion of the body assembly.

7. The method of claim 6, further including providing a new prechamber housing including a counterbore at a proximal end portion of the new prechamber housing wherein the counterbore is configured to form a press fit with the reduced diameter distal end portion of the body assembly.

8. The method of claim 7, further including removing material from the distal end of the outer peripheral wall of the body assembly and from the proximal end of the outer peripheral wall of the new prechamber housing to form mirror-image circumferential weld cut-out chamfers around the distal end of the body assembly and around the proximal end of the new prechamber housing.

9. The method of claim 8, further including:
press-fitting the reduced diameter distal end portion of the body assembly into the counterbore of the new prechamber housing; and
welding the proximal end of the outer peripheral wall of the new prechamber housing to the distal end of the outer peripheral wall of the body assembly, along a new circumferential weld joint spaced axially along the outer peripheral wall of the body assembly by a distance of 2.5-3 times the width W from the original circumferential weld joint.

10. A remanufactured prechamber assembly, comprising:
a remachined body assembly;
a new prechamber housing welded to the remachined body assembly along a new circumferential weld joint;
wherein: one of a distal end portion of the remachined body assembly and a proximal end portion of the new prechamber housing includes a reduced diameter portion; and
an axial length of the reduced diameter portion is configured to be fitted in a counterbore formed at the other of the distal end portion of the remachined body assembly and the proximal end portion of the new prechamber housing; and
a new circumferential weld bead extending around and joining a proximal end of an outer peripheral wall of the new prechamber housing and a distal end of an outer peripheral wall of the remachined body assembly along the new circumferential weld joint, and the new prechamber housing abuts the remachined body assembly at a location that is radially inward of the new circumferential weld bead;
wherein a centerline of the new circumferential weld bead is spaced axially along the outer peripheral wall of the remachined body assembly toward a proximal end of the remachined body assembly from a location of a centerline of an original circumferential weld bead at an original circumferential weld joint around a distal end of the outer peripheral wall of the body assembly by a distance of 2.5-3 times a width W of the original circumferential weld bead as measured in an axial direction parallel to a central axis of the prechamber assembly; and,
wherein a heat affected zone of the original circumferential weld bead extending cirucumferential around the center axis is removed.

11. The remanufactured prechamber assembly of claim 10, wherein the remachined body assembly includes a reduced diameter distal end portion with an outer diameter that is from 2.4 W to 4.0 W less than an outer diameter of an outer peripheral surface at the distal end portion of the remachined body assembly.

12. The remanufactured prechamber assembly of claim 10, further including one of the counterbore or the reduced diameter portion at the proximal end portion of the new prechamber housing that is configured to form a press fit with one of the reduced diameter portion or the counterbore, respectively, at the distal end portion of the remachined body assembly.

13. The remanufactured prechamber assembly of claim 12, wherein the one of the counterbore or the reduced diameter portion at the proximal end portion of the new prechamber housing is configured to mate along an axial length of the one of the reduced diameter portion or the counterbore, respectively, at the distal end portion of the remachined body assembly to form a cylindrical press fit interface.

14. The remanufactured prechamber assembly of claim 10, wherein:
  the distal end portion of the remachined body assembly includes the reduced diameter portion;
  the proximal end portion of the new prechamber housing includes the counterbore; and
  the axial length of the reduced diameter distal end portion of the remachined body assembly is 2.5 W-3.0 W longer than the axial length of the reduced diameter distal end portion of the body assembly before remachining.

15. The remanufactured prechamber assembly of claim 14, wherein the reduced diameter distal end portion of the remachined body assembly has an outer diameter that is from 2.4 W to 4.0 W less than an outer diameter of an outer peripheral surface of the distal end of the remachined body assembly.

16. The remanufactured prechamber assembly of claim 15, wherein the new prechamber housing includes a counterbore at a proximal end portion of the prechamber housing, wherein the counterbore is configured to form a press fit with the reduced diameter distal end portion of the remachined body assembly.

17. The remanufactured prechamber assembly of claim 16, further including mirror-image circumferential weld cut-out chamfers around the distal end of the remachined body assembly and the proximal end of the new prechamber housing.

18. The remanufactured prechamber assembly of claim 17, wherein:
  the reduced diameter distal end portion of the remachined body assembly is press fit into the counterbore of the new prechamber housing; and
  the proximal end of the outer peripheral wall of the new prechamber housing is welded to the distal end of the outer peripheral wall of the remachined body assembly along the new circumferential weld joint spaced axially along the outer peripheral wall of the remachined body assembly by a distance of 2.5-3 times the width W from a location of the original circumferential weld joint.

19. A method of remanufacturing a prechamber assembly, the prechamber assembly including a used prechamber housing welded to a body assembly, wherein a distal end portion of the body assembly includes a reduced diameter portion, a proximal end of the used prechamber housing includes a counterbore configured to receive the reduced diameter portion of the body assembly, and an original circumferential weld bead extends around and joins a proximal end of an outer peripheral wall of the used prechamber housing and a distal end of an outer peripheral wall of the body assembly along an original circumferential weld joint, the method comprising:

determining a width W of the original circumferential weld bead as measured in an axial direction parallel to a central axis of the prechamber assembly;

cutting through the weld bead in order to separate the used prechamber housing from the body assembly;

removing material from an outer peripheral portion of the distal end portion of the body assembly, wherein the material is removed in an axial direction parallel to the central axis of the prechamber assembly for a distance that is from 2.5-3 times the width W; and removing material from the outer peripheral portion of the distal end portion of the body assembly, wherein the material is removed in a radial direction relative to the central axis of the prechamber assembly to create a reduced diameter distal end portion of the body assembly that is from 2.4 W to 4 W smaller than the diameter of the outer peripheral surface at the distal end of the outer peripheral wall of the body assembly, welding the replacement prechamber housing to the body assembly with a new circumferential weld bead; and fitting the reduced diameter distal end portion of the body assembly into a counterbore at a proximal end of a replacement prechamber housing, prior to the welding of the replacement prechamber housing to the body assembly, such that the replacement prechamber housing abuts the body assembly at a location that is radially inward of the new circumferential weld bead;

wherein removing material comprises removing a heat affected zone of the original circumferential weld bead extending circumferentially around the central axis, based on the removal of material from an outer peripheral portion of the distal end portion of the body assembly.

20. The method of claim 19, further including wherein:

the fitting of the reduced diameter distal end portion of the body assembly further includes press fitting the reduced diameter distal end portion of the body assembly into a counterbore at a proximal end of the replacement prechamber housing; and the welding of the replacement prechamber housing to the body assembly further includes welding a proximal end of an outer peripheral wall of the replacement prechamber housing to the distal end of the outer peripheral wall of the body assembly along a new circumferential weld joint spaced axially along the outer peripheral wall of the body assembly by a distance of 2.5-3 times the width W from a location of the original circumferential weld joint.

* * * * *